(12) United States Patent
Tobinaga et al.

(10) Patent No.: US 8,797,452 B2
(45) Date of Patent: Aug. 5, 2014

(54) IMAGING DEVICE HAVING REDUCED ELECTROMAGNETIC WAVE INTERFERENCE

(75) Inventors: Masato Tobinaga, Hyogo (JP); Hirotsugu Fusayasu, Kyoto (JP); Masafumi Kumoi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/392,880

(22) PCT Filed: Apr. 27, 2011

(86) PCT No.: PCT/JP2011/002475
§ 371 (c)(1),
(2), (4) Date: Jul. 20, 2012

(87) PCT Pub. No.: WO2012/104930
PCT Pub. Date: Aug. 9, 2012

(65) Prior Publication Data
US 2012/0287317 A1    Nov. 15, 2012

(51) Int. Cl.
*H04N 5/225*    (2006.01)
(52) U.S. Cl.
USPC ............ 348/374; 348/373; 396/535; 396/542
(58) Field of Classification Search
USPC .......................... 348/373, 374; 396/535, 542
See application file for complete search history.

(56) References Cited

U.S. PATENT DOCUMENTS

| | | | |
|---|---|---|---|
| 7,692,689 B2 * | 4/2010 | Teramoto et al. ......... | 348/208.7 |
| 7,782,390 B2 * | 8/2010 | Lin ............................ | 348/340 |
| 7,782,391 B2 * | 8/2010 | Lin ............................ | 348/340 |
| 8,421,912 B2 * | 4/2013 | Tobinaga et al. ........... | 348/374 |
| 2004/0067054 A1 * | 4/2004 | Ichikawa et al. ........... | 396/448 |
| 2008/0094488 A1 * | 4/2008 | Oishi et al. ............... | 348/240.99 |
| 2010/0201863 A1 * | 8/2010 | Lin ............................ | 348/340 |

FOREIGN PATENT DOCUMENTS

| | | | |
|---|---|---|---|
| JP | 2001-051329 A | 2/2001 | |
| JP | 2002-006380 A | 1/2002 | |
| JP | 2003-298890 A | 10/2003 | |
| JP | 2005-039691 A | 2/2005 | |
| JP | 2005-229431 A | 8/2005 | |
| JP | 2007088425 | * 7/2006 | ............ H05K 1/11 |
| JP | 2007-088425 A | 4/2007 | |
| JP | 2007-335507 A | 12/2007 | |
| JP | 2008-198669 A | 8/2008 | |
| JP | 2008-211378 A | 9/2008 | |
| JP | 2008-271504 A | 11/2008 | |
| JP | 2010-041709 A | 2/2010 | |
| JP | 2010-050771 A | 3/2010 | |

\* cited by examiner

*Primary Examiner* — Paul Berardesca
(74) *Attorney, Agent, or Firm* — James W. Judge

(57) ABSTRACT

An imaging device of the present invention, which is an imaging device for shooting images or video of a photographic subject, includes: an imaging element for taking an optical image of the photographic subject and generating image data therefrom; a main circuit board that is for conducting signal processing on the image data generated by the imaging element and that includes a main circuit board ground ("GND") having a ground potential; an imaging element flexible cable that is connected to the main circuit board and on which the imaging element is mounted; a mount for fixing the imaging element and that includes a metallic component; and a metal plate that is connected to the mount and is disposed between the imaging element and the main circuit board. Wherein, the mount and the main circuit board GND are electrically connected.

5 Claims, 10 Drawing Sheets

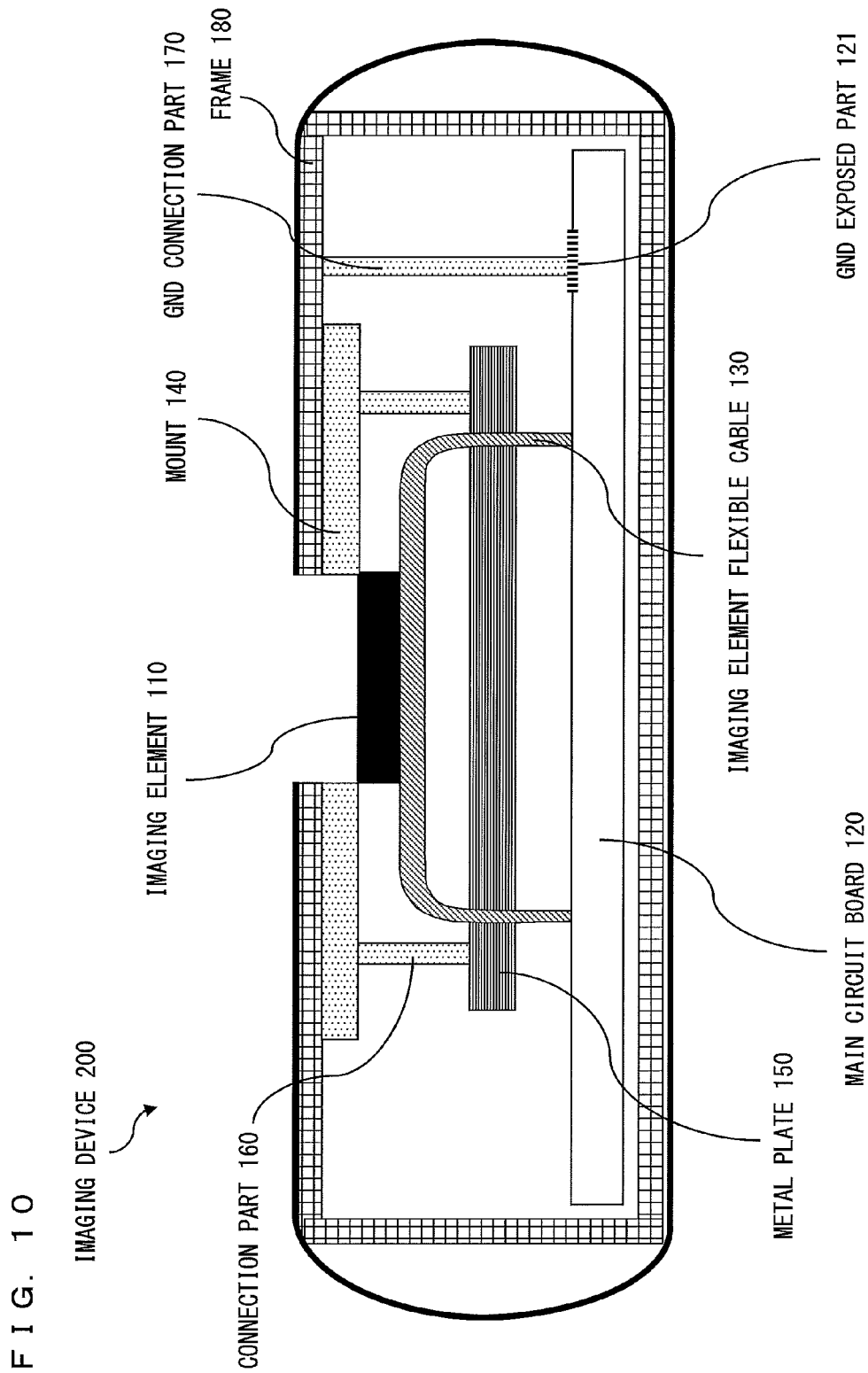

IMAGING DEVICE HAVING REDUCED ELECTROMAGNETIC WAVE INTERFERENCE

TECHNICAL FIELD

The present invention relates to imaging devices such as digital still cameras and the like, and more specifically, relates to imaging devices for reducing picture (or video) interference caused by external noise.

BACKGROUND ART

In recent years, occasions in which imaging devices such as digital still cameras and the like are employed in environments where electromagnetic wave-radiating handheld information terminals such as mobile phones and PHS's (Personal Handyphone Systems) are used are increasing. In addition, occasions in which imaging devices such as digital still cameras and the like are employed in environments, including the vicinity of radio broadcasting stations and television broadcasting stations, for example, where strong electromagnetic waves are radiated are also increasing.

When the imaging devices are used under such environments, the imaging devices may be subjected to electromagnetic wave interference. Such an environment where the imaging devices may be subjected to electromagnetic wave interference is referred to as "a strong electric field environment." If imaging devices such as digital still cameras and the like are used in a strong electric field environment, there are cases where picture (or video) interference occurs, such that images taken by the imaging devices contain striped-pattern noise (beat noise).

The picture (or video) interference becomes more prominent when the imaging elements that the imaging devices contain are high-performance (through having high sensitivity). Furthermore, associated with miniaturization of the imaging devices, the amount of external strong-electric-field noise coupled to the imaging elements incorporated in the miniaturized imaging devices increases, such that the picture (or video) interference becomes more prominent.

Causes of such picture (or video) interference include penetration of external electromagnetic waves into video signal lines of the imaging elements, or fluctuation of the ground ("GND") potential of imaging element flexible cables due to the influence of external electromagnetic waves.

Therefore, it has been necessary to take measures such as reducing the GND impedance of the imaging element flexible cables, or shielding the imaging elements along their periphery.

Another measure for reducing the picture (or video) interference is to connect a heat dissipation plate to the main board by using, for example, electrically conductive elastic members such as metal springs. However, with this measure, stress is applied on the imaging elements in the traveling direction of light, and thereby the imaging elements will tilt. As a result, deterioration of image quality occurs in images taken by the imaging devices, and therefore it has been difficult to introduce the measure in actual products.

Therein, configurations that have been used in conventional technology include a configuration of covering the entirety of an imaging device with a cover consisting of an electrically conductive medium, a configuration of adding an electrically conductive filter to the surface of the lens to shield the imaging elements against the entry of strong electric field noise (cf., for example, Patent Literature 1), and a configuration of forming a shield along the periphery of the imaging elements.

CITATION LIST

Patent Literature

[PTL 1] Japanese Laid-Open Patent Publication No. 2008-211378

SUMMARY OF THE INVENTION

Problems to be Solved by the Invention

However, with the configuration of covering the entirety of an imaging device with a cover consisting of an electrically conductive medium, the imaging device is made larger, proving troublesome for a user to handle. Furthermore, a problem with the configuration of adding an electrically conductive filter to the lens surface is that the amount of light entering the lens is reduced and the quality of obtained images deteriorates. Still further, a problem with the configuration of shielding the periphery of the imaging elements is that the internal configuration of the imaging device becomes complicated and consequently the pursuit of miniaturization of the imaging device as a final product becomes difficult.

Therefore, an object of the present invention, brought about in view of such circumstances, is to provide an imaging device that is capable of reducing picture (or video) interference caused by external noise without causing deterioration of the quality of images that are shot, even when being used in a strong electric field environment, and that is capable of achieving miniaturization through having a simple internal configuration.

Solution to the Problems

The present invention is directed toward an imaging device for reducing picture (or video) interference caused by external noise. In order to achieve the above described object, the imaging device of the present invention, which is an imaging device for shooting images or video of a photographic subject, includes: an imaging element for taking an optical image of the photographic subject and generating image data therefrom; a main circuit board that is for conducting signal processing on the image data generated by the imaging element and that includes a main circuit board ground ("GND") having a ground potential; an imaging element flexible cable that is connected to the main circuit board and on which the imaging element is mounted; a mount that is for fixing the imaging element and that includes a metallic component; and a metal plate that is connected to the mount and is disposed between the imaging element and the main circuit board. Wherein, the mount and the main circuit board GND are electrically connected.

Furthermore, preferably, the main circuit board includes, on one portion of the main circuit board GND, a GND exposed part; and the imaging device further includes a GND connection part for connecting the mount and the GND exposed part.

Furthermore, preferably, a tip of the GND connection part to which the GND exposed part is connected holds an electrically conductive elastic part.

Furthermore, preferably, the imaging device further includes a frame that covers the imaging device and that includes a metallic component, and the mount and the main circuit board GND are electrically connected via the frame.

Furthermore, preferably, the mount is in contact with the frame.

Furthermore, preferably, the main circuit board includes, on one portion of the main circuit board GND, a GND exposed part; and the imaging device further includes a frame that covers the imaging device and that includes a metallic component, and a GND connection part for connecting the frame and the GND exposed part.

Furthermore, in order to achieve the above described object, respective processes conducted by respective components of the imaging device of the present invention may be regarded as an imaging method for providing a series of process steps. The method may be provided in the form of a program for causing a computer to execute the series of process steps. The program may be recorded on a computer readable recording medium to be installed on a computer.

Advantageous Effects of the Invention

As described above, according to the imaging device of the present invention, picture (or video) interference caused by external noise can be reduced without causing deterioration of the quality of a taken image even when the device is used in a strong electric field environment, and miniaturization can be achieved through having a simple internal configuration.

BRIEF DESCRIPTION OF THE DRAWINGS

FIG. 10 is an internal structure cross sectional view of an imaging device 200 from an upper portion thereof, according to a second embodiment of the present invention.

DESCRIPTION OF EMBODIMENTS

Embodiments of the present invention will be described in the following with reference to the drawings.

First Embodiment

Figure 1:
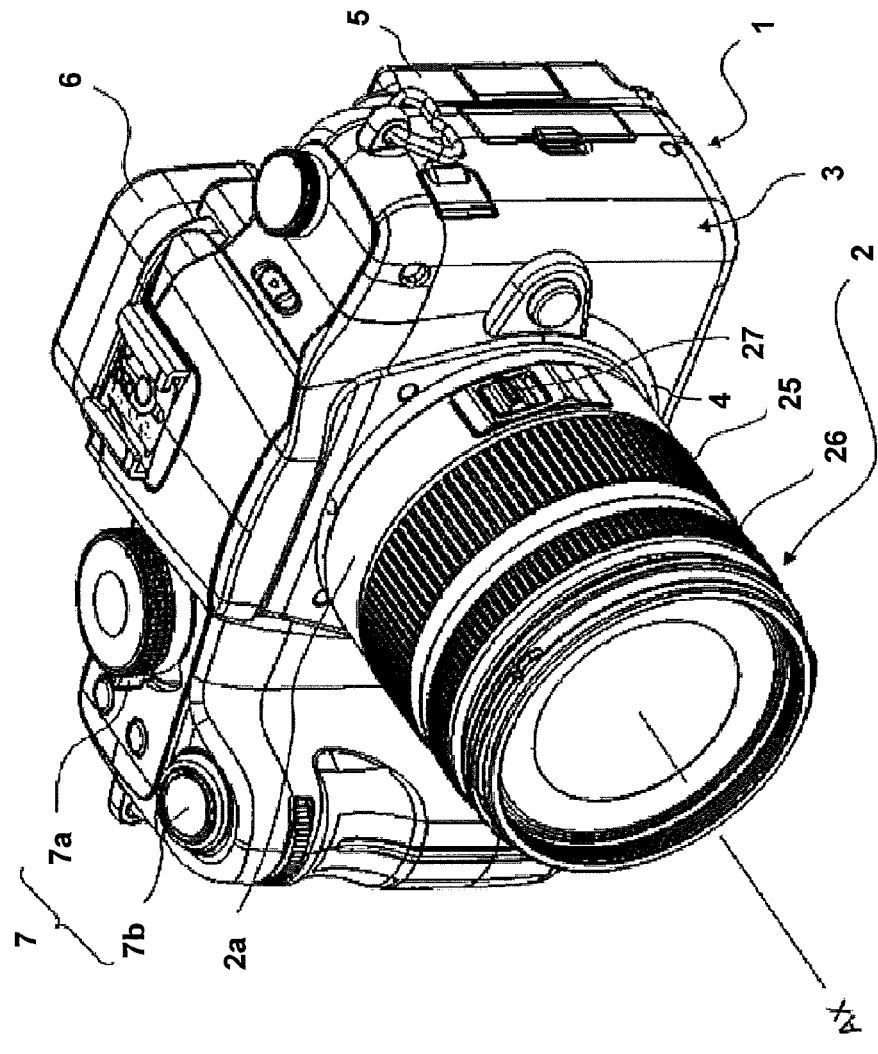
FIG. 1 is a perspective diagram showing an exterior view of a digital camera (one example of an imaging device) according to a first embodiment of the present invention.
Figure 2:
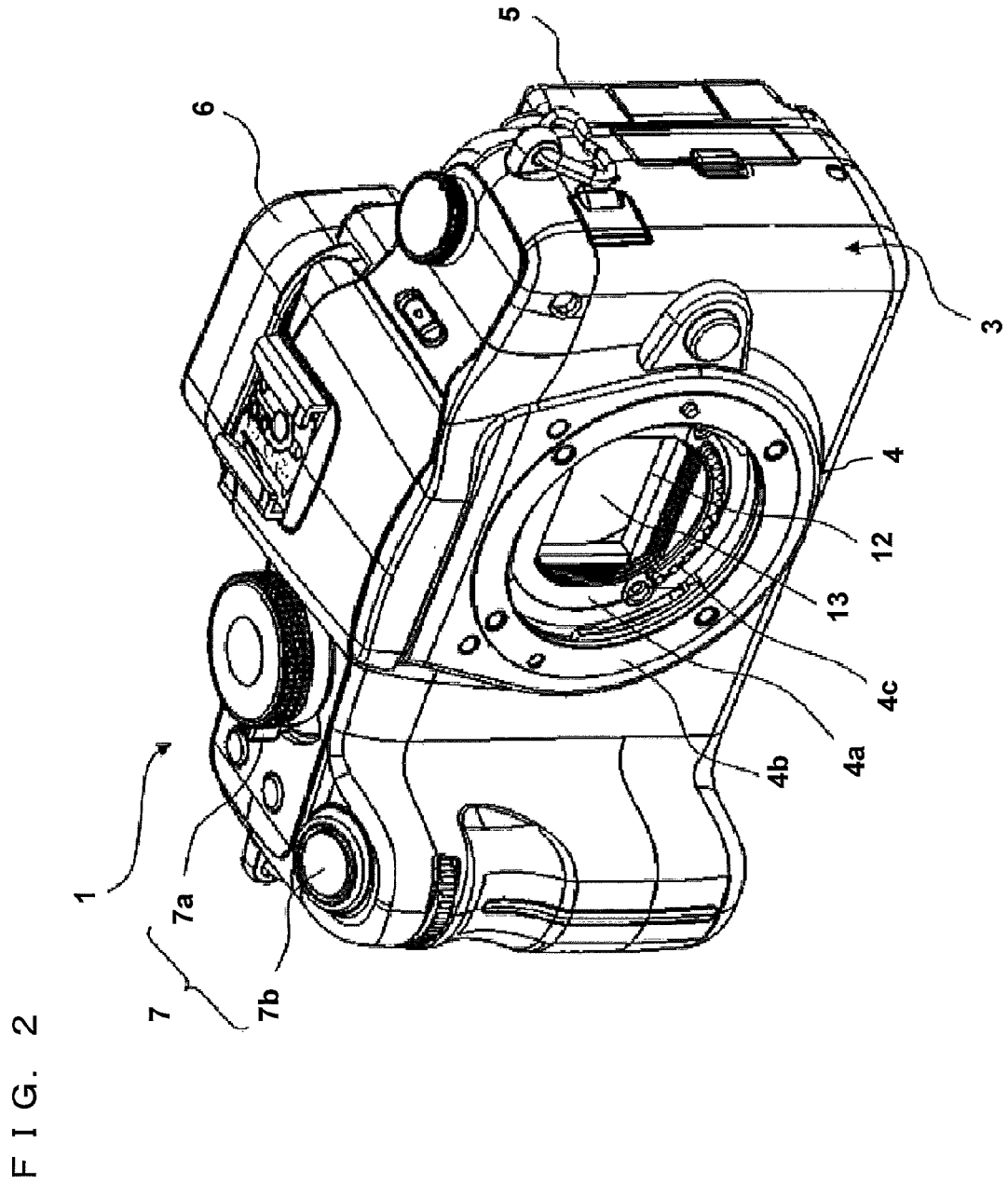
FIG. 2 is a perspective diagram showing an exterior view of a camera body 1 having removed therefrom an interchangeable lens unit 2.
Figure 3:
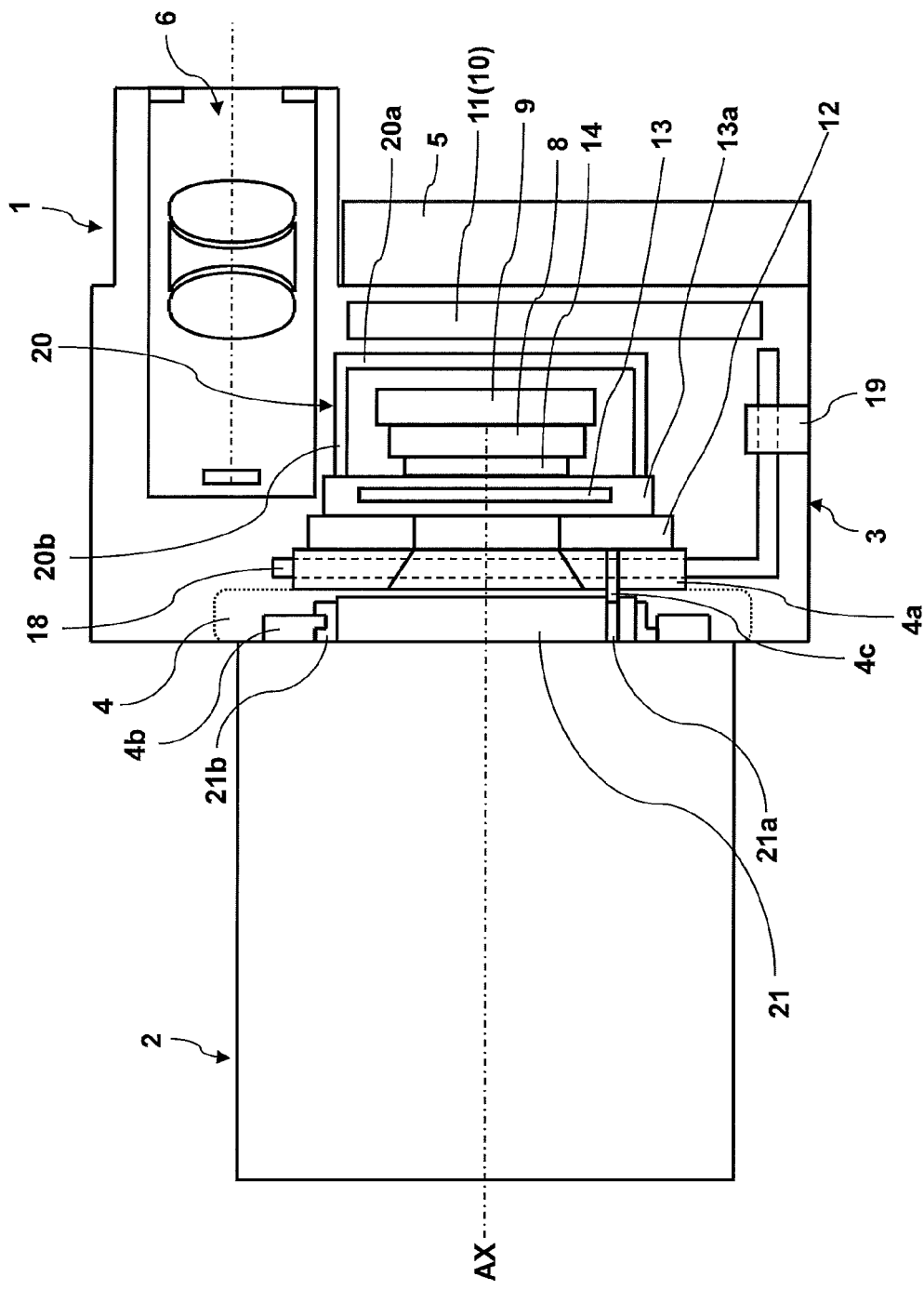
FIG. 3 is an outline cross sectional view of an internal structure of the digital camera.
Figure 4:
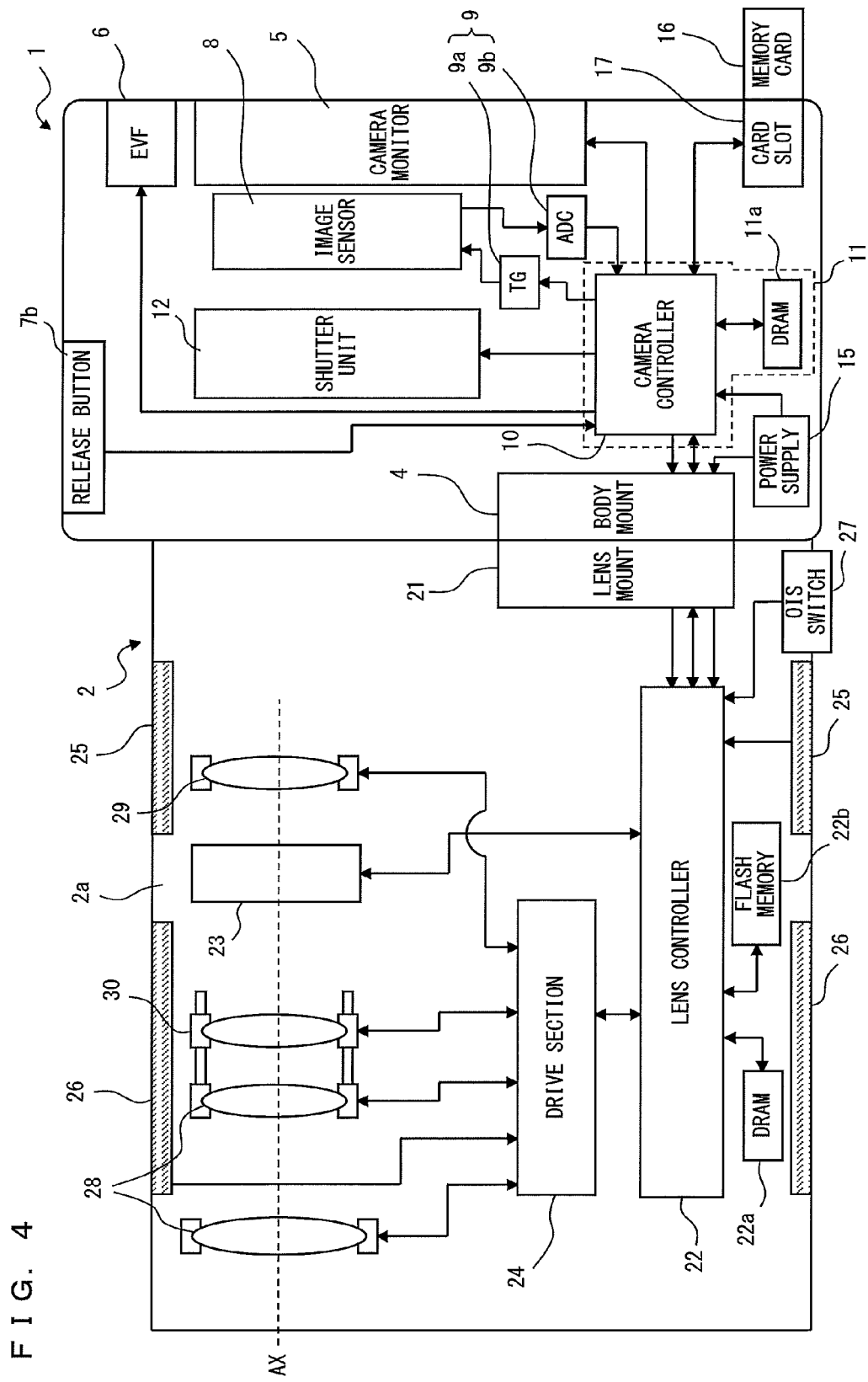
FIG. 4 is a functional block diagram of the digital camera.

FIG. 1 is a perspective diagram showing an exterior view of a digital camera (one example of an imaging device) according to a first embodiment of the present invention. The digital camera according to the first embodiment of the present invention includes a camera body 1 and an interchangeable lens unit 2 which can be mounted on the camera body 1. FIG. 2 is a perspective diagram showing an exterior view of the camera body 1 having removed therefrom the interchangeable lens unit 2. FIG. 3 is an outline cross sectional view of an internal structure of the digital camera. FIG. 4 is a functional block diagram of the digital camera.

Firstly, the basic configuration of the digital camera according to the first embodiment of the present invention will be described with reference to FIG. 1 to FIG. 4. Here, for convenience of description, the photographic-subject side of the digital camera is defined as the front, and imaging-surface side of the digital camera is defined as the back or rear.

In FIG. 1, the camera body 1 includes a main body housing 3, a body mount 4, a camera monitor 5, an electronic view finder (EVF) 6, and an operation section 7. The body mount 4 is arranged in the front surface side of the main body housing 3, and allows the interchangeable lens unit 2 to be mounted on the camera body 1. The camera monitor 5 is arranged in the back surface side of the main body housing 3, and includes a liquid crystal display, etc. The EVF 6 is arranged in the back surface side of the main body housing 3, and displays images and the like represented by display image data. The operation section 7 is arranged on an upper portion of the main body housing 3, and includes a power switch 7a, and a release button 7b for accepting shutter operation by a user.

The interchangeable lens unit 2 has, in a resin-made lens barrel 2a, an optical system including groups of lenses arranged on an optical axis AX to form an optical image of a photographic subject. A zoom ring 25, a focal ring 26, and an OIS (optical image stabilizer) switch 27 are disposed on an outer circumferential portion of the lens barrel 2a; and the positions of the lenses in the lens barrel 2a can be adjusted by rotating the zoom ring 25 and the focal ring 26.

In FIG. 2, the body mount 4 allows the interchangeable lens unit 2 to be mounted on the camera body 1, and includes a terminal support part 4a, a body mount ring 4b, and a connection terminal 4c. The camera body 1 includes, at a front surface of a portion where the interchangeable lens unit 2 is mounted on the camera body 1, a shutter unit 12 and a vibration plate 13.

In FIG. 3, the main body housing 3 of the camera body 1 includes therein a circuit board 9 having mounted thereon an image sensor 8 of CMOS (complementary metal oxide semiconductor) or CCD (charge-coupled device), and a main circuit board 11 including a camera controller 10. Furthermore, arranged in the main body housing 3 of the camera body 1, in order from the front, are the body mount 4, the shutter unit 12, the vibration plate 13, an optical low pass filter 14, the image sensor 8, the circuit board 9, a metal member 20, the main circuit board 11, and the camera monitor 5.

A vibration plate support part 13a supports the vibration plate 13 so as to be disposed at a predetermined position with regard to the image sensor 8, and is supported by a mainframe 18 via the body mount 4 and the shutter unit 12. The vibration plate 13 and the vibration plate support part 13a prevent dust from attaching to the image sensor 8.

The optical low pass filter 14 removes a high frequency component in the light from a photographic subject such that a photographic-subject image formed by the interchangeable lens unit 2 has a coarser resolution than the pitch of pixels in the image sensor 8. Generally, in an imaging element such as the image sensor 8, color filters for RGB colors and complementary color filters for YCM colors are arranged on each pixel in a Bayer pattern. As a result, if resolving is conducted on a single pixel, not only is false color generated but also a moiré phenomenon occurs in which a photographic subject having a repeat pattern becomes difficult to see; therefore, the optical low pass filter 14 is installed. The optical low pass filter 14 is given an IR cut-filter function for cutting infrared light.

The mainframe 18, which is made of metal and is arranged in the main body housing 3, connects the body mount 4 and the terminal support part 4a, and supports the interchangeable lens unit 2 via the body mount 4. Furthermore, a tripod attaching part 19 having a screw hole to have a tripod attached thereon is mechanically connected to the mainframe 18, and the screw hole is exposed on a bottom surface of the main body housing 3. In addition, the metal member 20, which is arranged so as to surround the circuit board 9 having the image sensor 8 mounted thereon, is a member for promoting dissipation of heat generated by the image sensor 8; and includes a metal plate 20a (perpendicular to the optical axis AX) disposed between the circuit board 9 and the main circuit board 11, and a heat conduction part 20b (parallel to the optical axis AX) for transferring heat from the metal plate 20a to the body mount 4 side.

The body mount 4 is a component for mounting the interchangeable lens unit 2 on the camera body 1, and is electrically and mechanically connected to a lens mount 21 of the interchangeable lens unit 2. The body mount 4 includes the body mount ring 4b, which has a ring shape and is made of metal, attached to the front surface of the main body housing 3, and the connection terminal 4c disposed on the terminal support part 4a. When the interchangeable lens unit 2 is mounted on the camera body 1, a connection terminal 21a disposed on the lens mount 21 becomes electrically connected to the connection terminal 4c.

The body mount ring 4b of the body mount 4 mechanically holds the interchangeable lens unit 2 to the camera body 1, when the body mount ring 4b is fitted to a metallic lens mount ring 21b of the lens mount 21 disposed on the interchangeable lens unit 2. The lens mount ring 21b is fitted in the body mount ring 4b through a so-called bayonet mechanism.

Specifically, depending on the rotation-positional relationship with the body mount ring 4b around the optical axis, the lens mount ring 21b assumes a first state of not being fitted to the body mount ring 4b, and a second state of being fitted to the body mount ring 4b. In the first state, the lens mount ring 21b can be moved with regard to the body mount ring 4b in the optical axis direction and can be inserted in the body mount ring 4b. When the lens mount ring 21b is rotated with regard to the body mount ring 4b in a state of being inserted in the body mount ring 4b, the lens mount ring 21b fits to the body mount ring 4b. The rotation-positional relationship between the body mount ring 4b and the lens mount ring 21b at that moment is the second state.

Furthermore, in a state where the interchangeable lens unit 2 is mounted on the camera body 1, the connection terminal 4c is electrically in contact with the connection terminal 21a included in the lens mount 21. In this manner, the body mount 4 and the lens mount 21 are electrically connected via the connection terminal 4c of the body mount 4 and the connection terminal 21a of the lens mount 21. As a result, in the digital camera, image data signals and control signals can be transmitted and received between the camera body 1 and the interchangeable lens unit 2 via the body mount 4 and the lens mount 21.

With FIG. 4, firstly, an internal function of the camera body 1 will be described in detail.

The body mount 4 and the lens mount 21 transmit and receive image data and control signals between the camera controller 10 and a lens controller 22 included in the interchangeable lens unit 2. Furthermore, included in the main body housing 3 is a power supply block 15 including a battery and the like for supplying power to various parts such as the camera controller 10; and the power supply block 15 supplies power also to the whole interchangeable lens unit 2 via the body mount 4 and the lens mount 21.

The image sensor 8 functions based on a timing signal from a timing signal generator (TG) 9a mounted on the circuit board 9, and generates still image data and video data by converting, into image data, a photographic-subject image which is an optical image of a photographic subject received through the interchangeable lens unit 2. The generated image data such as still image data and video data are converted into digital signals by an ADC (analog-to-digital-converter) 9b mounted on the circuit board 9, and various image processing operations are performed thereon by the camera controller 10. The various image processing operations performed by the camera controller 10 include, for example, a gamma correction process, a white balance adjustment process, a flaw correction process, a YC conversion process, an electronic zoom process, and a JPEG compression process. The function of the circuit board 9 may be included in the main circuit board 11.

Furthermore, the image data generated by the image sensor 8 is also used for displaying a through-the-lens image. Here, a through-the-lens image is an image whose data, among the video data, is not stored in a memory card 16, and is displayed on the camera monitor 5 and/or the EVF 6 to determine the composition of a video image or a still image.

The camera controller 10, which is mounted on the main circuit board 11, controls various parts of the camera body 1, and also transmits signals for controlling the interchangeable lens unit 2 to the lens controller 22 via the body mount 4 and the lens mount 21. On the other hand, the camera controller 10 receives various signals from the lens controller 22 via the body mount 4 and the lens mount 21. In this manner, the camera controller 10 indirectly controls various parts of the interchangeable lens unit 2.

Furthermore, the camera controller 10 uses a DRAM 11a mounted on the main circuit board 11 as a working memory during a control action and an image-processing action. Furthermore, the camera body 1 contains a card slot 17 for conducting, based on a control signal transmitted from the camera controller 10, input/output of still image data and video data to/from the memory card 16 mounted on the camera body 1.

The shutter unit 12 disposed between the body mount 4 and the image sensor 8 is a so-called focal-plane shutter, and allows blocking of light to the image sensor 8. The shutter unit 12 includes a rear curtain, a front curtain, and a shutter support frame provided with an aperture through which light from a photographic subject passes to be guided to the image sensor 8; and the exposure time of the image sensor 8 is adjusted by placing/removing the rear curtain and the front curtain to/from the aperture of the shutter support frame.

Next, the internal function of the interchangeable lens unit 2 will be described in detail.

The interchangeable lens unit 2 includes, in the resin-made lens barrel 2a, the optical system including groups of lenses arranged on the optical axis AX to form an optical image of a photographic subject, the lens mount 21, the lens controller 22, a diaphragm unit 23, and a drive section 24 for driving the groups of lenses in the optical system.

Furthermore, the zoom ring 25, the focal ring 26, and the OIS switch 27 are disposed on the outer circumferential portion of the lens barrel 2a; and the positions of the lenses in the lens barrel 2a can be adjusted by rotating the zoom ring 25 and the focal ring 26.

The optical system includes a lens group 28 for zooming, a lens group 29 for OIS, and a lens group 30 for focusing. The lens group 28 for zooming changes the focal length of the optical system. The lens group 29 for OIS suppresses moving of a photographic-subject image formed by the optical system with regard to the image sensor 8. The lens group 30 for focusing changes the focal state of the photographic-subject image formed on the image sensor 8 by the optical system.

The diaphragm unit 23 is a light-volume adjusting member for adjusting the amount of light that passes through the optical system; and more specifically, includes diaphragm blades capable of blocking a part of the beam of light that passes through the optical system, and a diaphragm drive section for driving the diaphragm blades.

The drive section 24 drives the groups of lenses of the above described optical system based on the control signals from the lens controller 22, and includes a detection section for detecting the positions of each of the groups of lenses of the optical system.

The lens controller 22 controls the whole interchangeable lens unit 2 based on the control signals transmitted from the camera controller 10 of the camera body 1. The lens controller 22 receives information of the positions detected by the detection section of the drive section 24 for each of the groups of lenses of the optical system, and transmits the information to the camera controller 10. The camera controller 10 generates control signals for controlling the drive section 24 based on the received information of the positions, and transmits the control signals to the lens controller 22.

Then, the lens controller 22 transmits the control signals generated by the camera controller 10 to the drive section 24, and the drive section 24 adjusts the positions of the lens groups 28, 29, and 30 based on the control signals from the lens controller 22.

On the other hand, the camera controller 10 generates control signals for operating the diaphragm unit 23, based on information representing the amount of light received by the image sensor 8, information indicating whether photographing of a still image or a video is to be conducted, information indicating whether an operation has been performed to set priority to the aperture value, and the like. During this time, the lens controller 22 relays the control signals generated by the camera controller 10 to the diaphragm unit 23.

A DRAM 22a and a flash memory 22b are retained in the interchangeable lens unit 2; and the lens controller 22 uses the DRAM 22a as a working memory when driving the diaphragm unit 23 and each of the lens groups 28, 29, and 30 of the optical system. Furthermore, parameters and programs used by the lens controller 22 are stored in the flash memory 22b.

Although the digital camera (one example of the imaging device) according to the first embodiment of the present invention has been described by using FIG. 1 to FIG. 4, other imaging devices may be employed as long as they utilize controlling of the GND potential of a later described main circuit board.

In the following, the controlling of the GND potential of the main circuit board will be described in detail as means for reducing picture (or video) interference caused by external noise.

Figure 5:
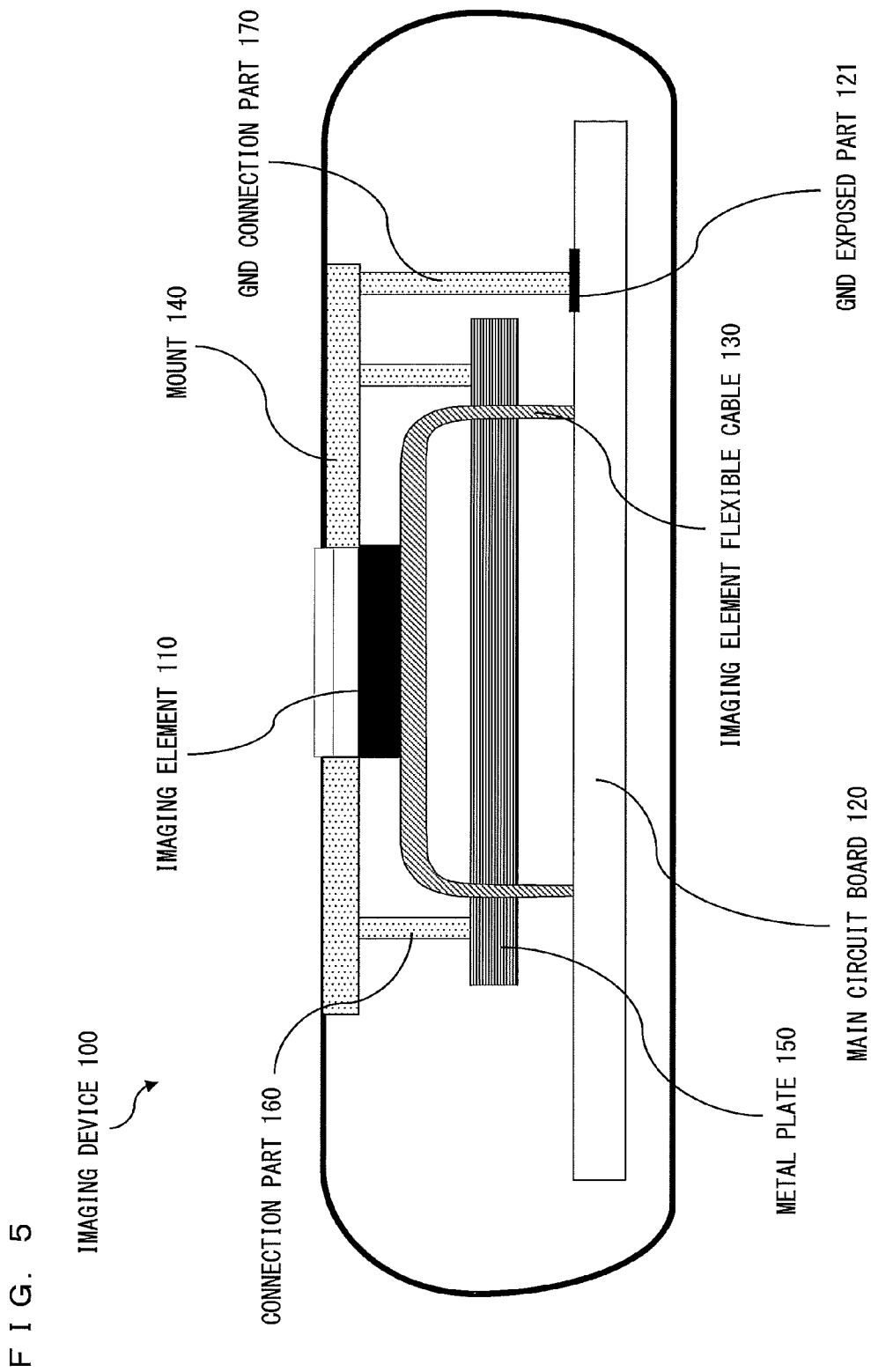
FIG. 5 is an internal structure cross sectional view of an imaging device 100 from an upper portion thereof, according to the first embodiment of the present invention.

FIG. 5 is an internal structure cross sectional view of an imaging device 100 from an upper portion thereof, according to the first embodiment of the present invention. Here, mainly, the controlling of the GND potential of the main circuit board will be described and detail descriptions of those other than the controlling are omitted; however, the basic configuration of the imaging device 100 is similar to the configuration of the digital camera described by using FIG. 1 to FIG. 4.

In FIG. 5, the imaging device 100 includes an imaging element 110, a main circuit board 120, an imaging element flexible cable 130, a mount 140, a metal plate 150, a connection part 160, and a GND connection part 170. The main circuit board 120 includes a GND exposed part 121.

The imaging element 110 is, for example, CMOS or CCD, and corresponds to the above described image sensor 8 and circuit board 9. The imaging element 110 generates still image data and video data by converting, into image data, a photographic-subject image which is an optical image of a photographic subject received through the lenses.

The main circuit board 120 performs various signal processing operations on the image data generated by the imaging element 110. Here, the various signal processing operations are the above described various image processing operations performed by the camera controller 10, and include, for example, a gamma correction process, a white balance adjustment process, a flaw correction process, a YC conversion process, an electronic zoom process, and a JPEG compression process.

In addition, the main circuit board 120 includes a main circuit board GND, and representatively, one portion of the main circuit board GND 122 is the GND exposed part 121. Furthermore, the mount 140 and the main circuit board GND 122 are electrically connected, by having an edge at one end of the GND connection part 170 connected to the GND exposed part 121 and by having an edge at the other end connected to the mount 140. Details of the connection between the mount 140 and the GND exposed part 121 will be described later.

The imaging element flexible cable 130 is, for example, the above described circuit board 9, and has the imaging element 110 mounted thereon. Furthermore, the imaging element flexible cable 130 is connected to the main circuit board 120.

The mount 140 is, for example, the above described body mount 4, and allows mounting of a lens unit (not shown) on a main body housing, and also fixes the imaging element 110. The mount 140 also fixes an SSWF (super sonic wave filter) (not shown) for removing dust from the surface of the imaging element 110, a shutter unit (not shown), and a flash unit (not shown). Furthermore, the mount 140 includes, for example, a metallic component such as aluminum and stainless steel, because of their reliability against impacts from dropping, and to dissipate heat, and as a measure against unnecessary electromagnetic radiation.

The metal plate 150 is disposed between the imaging element 110 and the main circuit board 120, and is, for example, the metal plate 20a in the above described metal member 20; and includes a metallic component such as aluminum and copper, which have high electric conductivity and thermal conductivity, and which efficiently release heat generated by the imaging element 110.

The connection part 160 electrically connects the mount 140 and the metal plate 150. Representatively, the connection part 160 is a screw consisting of a metallic component, and fixes the mount 140 and the metal plate 150.

Figure 6:
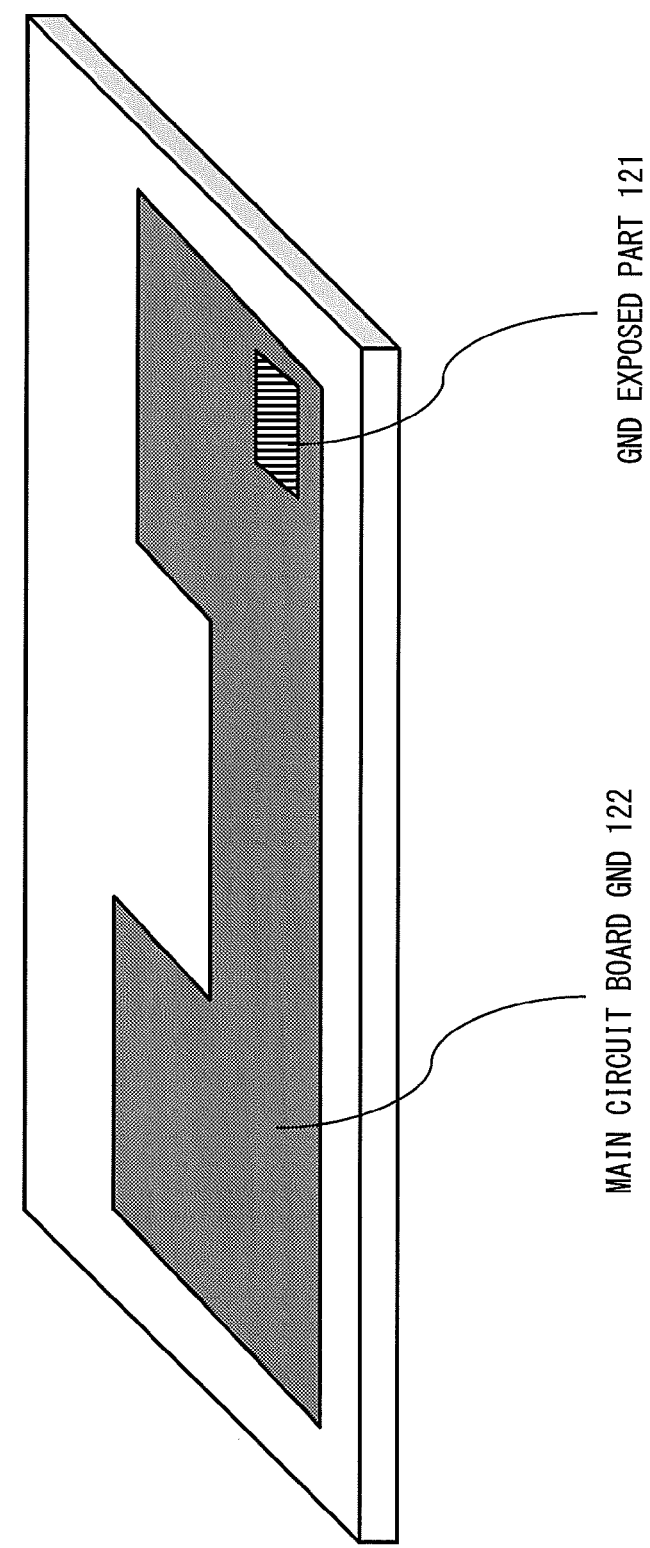
FIG. 6 is a perspective diagram showing a main circuit board 120.

Next, the connection between the mount 140 and the GND exposed part 121 will be described specifically. FIG. 6 is a perspective diagram showing the main circuit board 120. An LSI (large scale integration) for video image processing and another LSI (not shown) for lens control are mounted on the main circuit board 120, and the imaging element flexible cable 130 is connected (not shown) to the main circuit board 120.

In FIG. 6, the main circuit board 120 includes the main circuit board GND 122, and has, on one portion of the main circuit board GND 122, the GND exposed part 121. Furthermore, the mount 140 and the main circuit board GND 122 are electrically connected, by having an edge at one end of the GND connection part 170 connected to the GND exposed part 121 and by having an edge at the other end connected to the mount 140.

Figure 7:
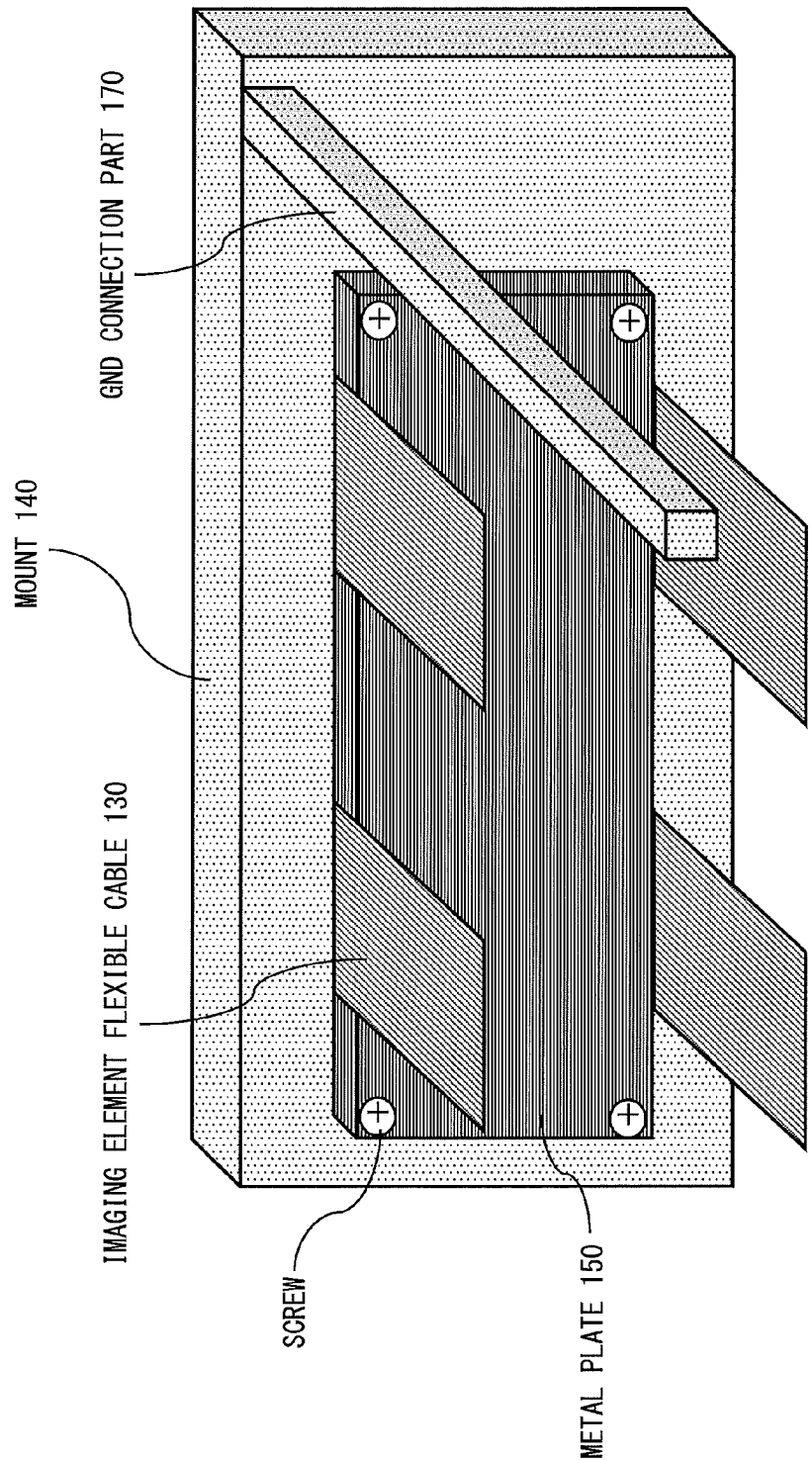
FIG. 7 is a perspective diagram showing a state in which an imaging element flexible cable 130 and a metal plate 150 are connected to a mount 140, and a GND connection part 170 is further connected thereto.

FIG. 7 is a perspective diagram showing a state in which the imaging element flexible cable 130 and the metal plate 150 are connected to the mount 140, and the GND connection part 170 is further connected thereto. In FIG. 7, the mount 140 and the metal plate 150 are fixed by, for example, a metallic component such as a screw, and are electrically connected. Furthermore, the imaging element flexible cable 130 and the metal plate 150 are fixed by, for example, an adhesive (not shown). By being directly connected to the mount 140, the GND connection part 170 is integrated with the mount 140. A tip portion of the GND connection part 170 is connected to the GND exposed part 121 (not shown).

Here, although the GND connection part 170 includes a square-pillar shaped metallic component that is integrated with the mount 140, the configuration of the GND connection part 170 is not limited to this, and other shapes and members may be employed as long as they electrically connect the mount 140 and the GND exposed part 121. For example, the GND connection part 170 may take a cylindrical shape formed from an electrically conductive member, and may take other shapes including curved contours.

Figure 8:
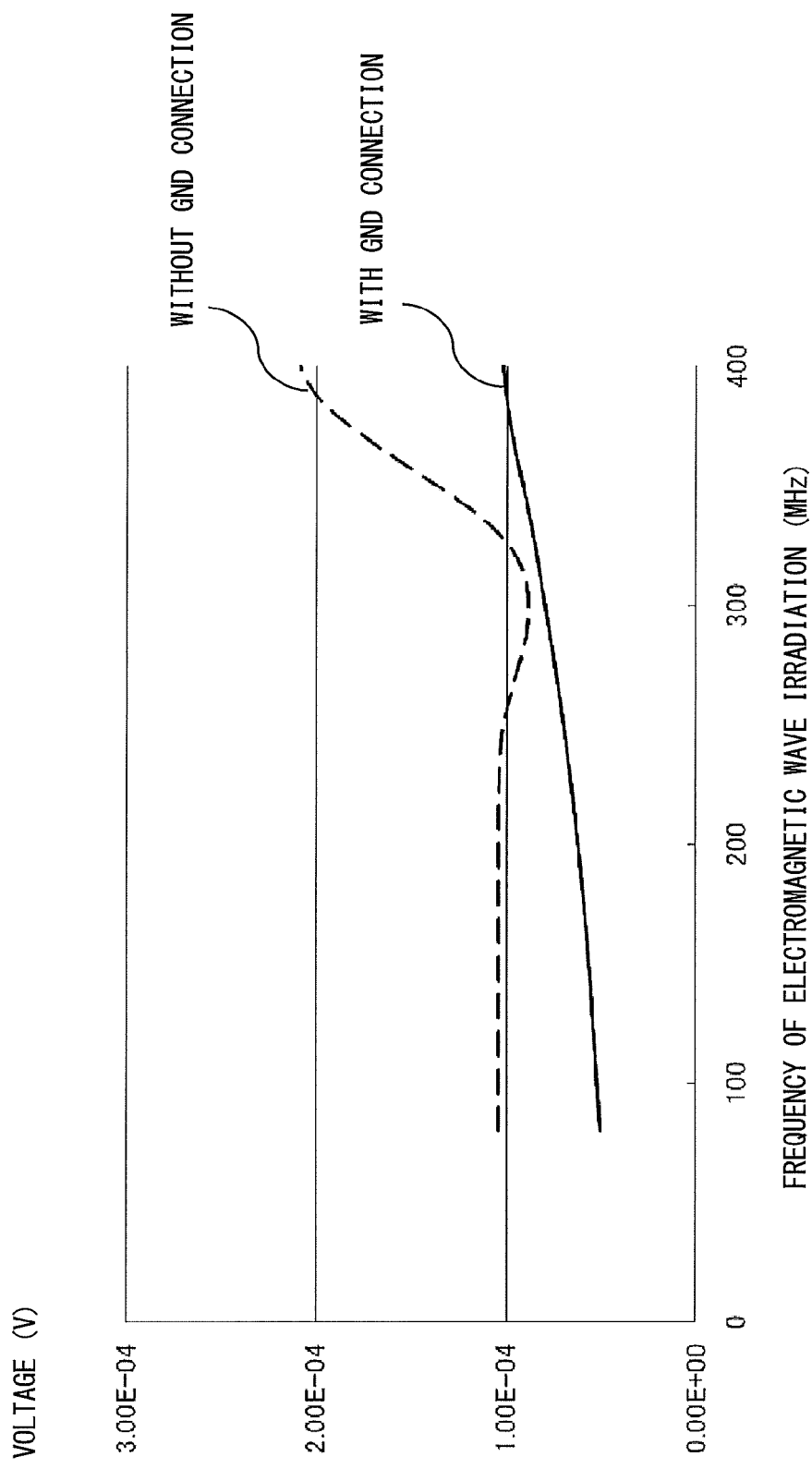
FIG. 8 shows voltage induced at a position of an imaging element 110 in a case where there is a GND connection and in a case where there is no GND connection for the mount 140 and the main circuit board 120.
Figure 9:
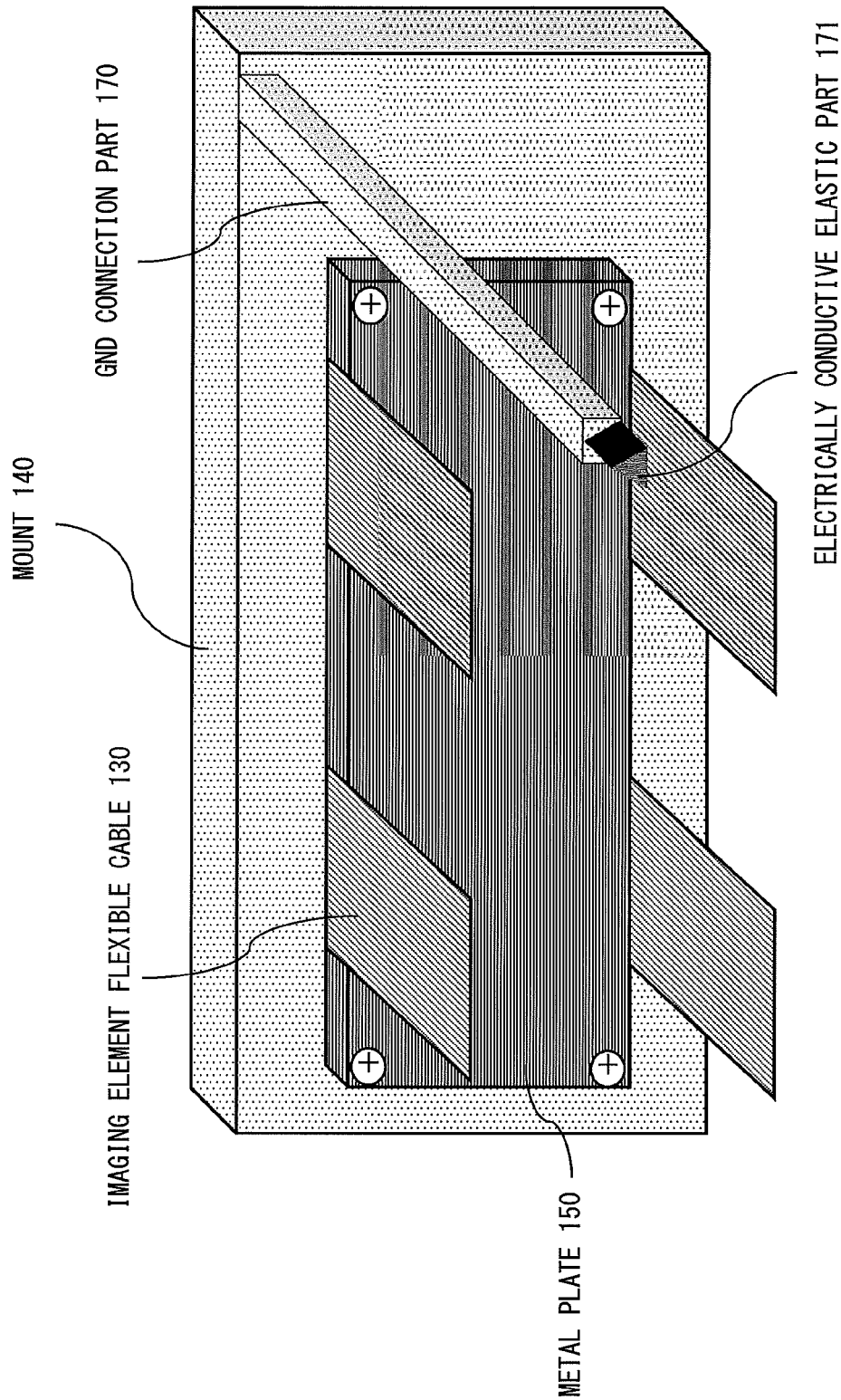
FIG. 9 is a perspective diagram showing a state where the imaging element flexible cable 130 and the metal plate 150 are connected to the mount 140, and the GND connection part 170 is further connected thereto, and an electrically conductive elastic part 171 is included at a tip portion of the GND connection part 170.

FIG. 8 shows voltage induced at a position of the imaging element 110 in a case where there is a GND connection and in a case where there is no GND connection for the mount 140 and the main circuit board 120. Specifically, FIG. 9 shows a result obtained through simulation, by using FDTD (finite difference time domain) method, for voltage induced at the position of the imaging element 110 with a uniform external electromagnetic field irradiation of 3 V/m being applied on the imaging device 100.

In FIG. 8, the horizontal axis represents frequency of the applied external electromagnetic field, and the vertical axis represents strength of voltage induced at the position of the imaging element 110. A solid line indicates the strength of voltage in the case where there is a GND connection for the mount 140 and the main circuit board 120, and a dashed line indicates the strength of voltage in the case where there is no GND connection for the mount 140 and the main circuit board 120. The case where there is no GND connection for the mount 140 and the main circuit board 120 includes, for example, a case where the GND connection part 170 integrated to the mount 140 is absent and thereby there is no connection between the mount 140 and the GND exposed part 121 of the main circuit board 120.

As shown in FIG. 8, when compared to the case where there is no GND connection for the mount 140 and the main circuit board 120, having a GND connection for the mount 140 and the main circuit board 120 reduces the voltage induced in the imaging element 110. As a result, picture (or video) interference on an image taken by the imaging device 100 can be reduced.

As described above, in the imaging device 100 according to the first embodiment of the present invention, by electrically connecting the mount 140 and the GND exposed part 121 of the main circuit board 120, external strong electric field noise received by the mount 140 is prevented from entering the imaging element flexible cable 130 and can be directly released to the main circuit board GND 122. As a result, fluctuation of the GND potential of the imaging element flexible cable 130 can be suppressed.

Thus, with the imaging device 100 according to the first embodiment of the present invention, picture (or video) interference caused by external noise can be reduced without causing deterioration of the quality of a taken image even when the imaging device 100 is used in a strong electric field environment, and miniaturization can be achieved through having a simple internal configuration.

As shown in FIG. 7, the GND connection part 170 in the imaging device 100 according to the first embodiment of the present invention includes a square pillar-shaped metallic component that is integrated with the mount 140, and the tip portion of the GND connection part 170 is directly connected to the GND exposed part 121 of the main circuit board 120; however, for example, an electrically conductive elastic part such as a spring formed from a metal member may be included at the tip portion of the GND connection part 170.

FIG. 9 is a perspective diagram showing a state where the imaging element flexible cable 130 and the metal plate 150 are connected to the mount 140, and the GND connection part 170 is further connected thereto, and an electrically conductive elastic part 171 is included at the tip portion of the GND connection part 170. In FIG. 9, the mount 140 and the metal plate 150 are fixed by, for example, a metallic component such as a screw, and are electrically connected. Furthermore, the imaging element flexible cable 130 and the metal plate 150 are fixed by, for example, an adhesive (not shown). By being directly connected to the mount 140, the GND connection part 170 is integrated with the mount 140.

Furthermore, the electrically conductive elastic part 171 is included at the tip portion of the GND connection part 170, and thereby the tip portion of the GND connection part 170 is connected to the GND exposed part 121 (not show) via the electrically conductive elastic part 171. With this, the mount 140 and the GND exposed part 121 are electrically connected.

As described above, by having the electrically conductive elastic part 171 at the tip portion of the GND connection part 170, impact on the main circuit board 120 can be lessened. Furthermore, when electrically connecting the mount 140 and the GND exposed part 121 of the main circuit board 120 by using the GND connection part 170, mounting can be conducted more easily by including the electrically conductive elastic part 171 having elasticity at the tip portion of the GND connection part 170.

Second Embodiment

FIG. 10 is an internal structure cross sectional view of an imaging device 200 from an upper portion thereof, according to a second embodiment of the present invention. Here, mainly, the controlling of the GND potential of the main circuit board will be described and detail descriptions of those other than the controlling are omitted; however, the basic configuration of the imaging device 200 is similar to the configuration of the digital camera described by using FIG. 1 to FIG. 4.

In FIG. 10, the imaging device 200 includes the imaging element 110, the main circuit board 120, the imaging element flexible cable 130, the mount 140, the metal plate 150, the connection part 160, the GND connection part 170, and a frame 180. The main circuit board 120 includes the GND exposed part 121.

In FIG. 10, components identical to those of the imaging device 100 according to the first embodiment of the present invention shown in FIG. 5 are given identical reference characters; and detailed descriptions thereof are omitted. Here, mainly, differences from the first embodiment of the present invention will be described.

The frame 180 includes, for example, a metallic component such as aluminum or stainless steel, and is in contact with the mount 140. Furthermore, as shown in FIG. 10, the frame 180 may be arranged so as to enclose an inner circumferential portion of the exterior of the imaging device 200 in order to improve reliability against impact from dropping.

Furthermore, the frame 180 and the main circuit board GND 122 are electrically connected by having an edge at one end of the GND connection part 170 connected to the GND exposed part 121 and by having an edge at the other end connected to the frame 180. In other words, GND connection is established for the mount 140 and the main circuit board 120 via the frame 180. With this, of course, voltage induced in the imaging element 110 can be reduced, and as a result, picture (or video) interference on an image taken by the imaging device 200 can be reduced, as similar to the advantageous effect described in the first embodiment of the present invention.

As described above, in the imaging device 200 according to the second embodiment of the present invention, by electrically connecting the GND exposed part 121 of the main circuit board 120 and the frame 180 which is in contact with the mount 140, external strong electric field noise received by the mount 140 is prevented from entering the imaging element flexible cable 130 and can be released to the main circuit board GND 122. As a result, fluctuation of the GND potential of the imaging element flexible cable 130 can be suppressed.

Thus, with the imaging device 200 according to the second embodiment of the present invention, picture (or video) interference caused by external noise can be reduced without causing deterioration of the quality of a taken image even when the imaging device 200 is used in a strong electric field environment, and miniaturization can be achieved through having a simple internal configuration.

In the imaging device 200 according to the second embodiment of the present invention, although a configuration of including the frame 180 formed from a metallic component that makes contact with the mount 140 is used, the present invention is not limited thereto. For example, it is not necessary to have the frame 180 as long as the exterior of the imaging device 200 includes a metallic component and the exterior is in direct contact with the mount 140. In this case, the exterior and the main circuit board GND 122 are electrically connected by having an edge at one end of the GND connection part 170 connected to the GND exposed part 121 and by having an edge at the other end connected to the exterior.

Furthermore, in the present embodiment, although the mount 140 and the frame 180 are in contact with each other, it is not necessary to have them in contact with each other. Since the frame 180 and the GND exposed part 121 of the main circuit board 120 are electrically connected, external strong electric field noise received by the frame 180 is prevented from entering the imaging element flexible cable 130 via the mount 140 and can be released to the main circuit board GND 122.

Furthermore, for example, a non-conductive member such as resin may be used as the mount 140. Since the frame 180 and the GND exposed part 121 of the main circuit board 120 are electrically connected, external strong electric field noise received by the frame 180 is prevented from entering the imaging element flexible cable 130 via the mount 140 and can be released to the main circuit board GND 122.

While the invention has been described in detail, the foregoing description is in all aspects illustrative and not restrictive. It is needless to say that numerous other modifications and variations can be devised without departing from the scope of the invention.

INDUSTRIAL APPLICABILITY

The present invention is applicable to an imaging device such as a digital camera and the like, and is particularly useful for an imaging device and the like used in a strong electric field environment.

DESCRIPTION OF THE REFERENCE CHARACTERS 1 camera body
2 interchangeable lens unit
2a lens barrel
3 main body housing
4 body mount
4a terminal support part
4b body mount ring
4c connection terminal
5 camera monitor
6 EVF
7 operation section
7a power switch
7b release button
8 image sensor
9 circuit board
9a timing signal generator
10 camera controller
11 main circuit board
11a, 22a DRAM
12 shutter unit
13 vibration plate
13a vibration plate support part
14 optical low pass filter
15 power supply block
16 memory card
17 card slot
18 mainframe
19 tripod attaching part
20 metal member
20a metal plate
20b heat conduction part
21 lens mount
21a connection terminal
21b lens mount ring
22 lens controller
22b flash memory
23 diaphragm unit
24 drive section
25 zoom ring
26 focal ring
27 OIS switch
28, 29, 30 lens group
100, 200 imaging device
110 imaging element
120 main circuit board
121 GND exposed part
122 main circuit board GND
130 imaging element flexible cable
140 mount
150 metal plate
160 connection part 170 GND connection part
171 electrically conductive elastic part
180 frame

The invention claimed is:
1. An imaging device for shooting images or video of a photographic subject, the imaging device having a front side where a mount is located and a rear side where an imaging surface is located, the imaging device comprising:
   an imaging element for taking an optical image of the photographic subject and generating image data therefrom;
   a main circuit board for conducting signal processing on the image data generated by the imaging element, and including a main circuit board GND having a ground potential;
   an imaging element flexible cable connected to the main circuit board, and on which the imaging element is mounted;
   a mount, composed of a metallic component, arranged in the front side of the imaging device and therein fixing the imaging element, such that the imaging element flexible cable, and the imaging element as mounted on the flexible cable, are disposed to the rear of the mount;
   a metal plate connected to the mount and disposed between the imaging element and the main circuit board; and
   a frame covering the imaging device, and being composed of a metallic component; wherein
   the mount and the main circuit board GND are electrically connected, and
   the mount and the imaging element are not electrically connected.

2. The imaging device according to claim 1, wherein:
   the main circuit board includes, on one portion of the main circuit board GND, a GND exposed part; and
   the imaging device further comprises a GND connection part connecting the mount and the GND exposed part.

3. The imaging device according to claim 2, wherein a tip of the GND connection part to which the GND exposed part is connected holds an electrically conductive elastic part.

4. The imaging device according to claim 1, wherein the mount is in contact with the frame.

5. An imaging device for shooting images or video of a photographic subject, the imaging device having a front side where a mount is located and a rear side where an imaging surface is located, the imaging device comprising:
   an imaging element for taking an optical image of the photographic subject and generating image data therefrom;
   a main circuit board for conducting signal processing on the image data generated by the imaging element, and including a main circuit board GND having a ground potential;
   an imaging element flexible cable connected to the main circuit board and on which the imaging element is mounted;
   a mount, composed of a metallic component, arranged in the front side of the imaging device and therein fixing the imaging element, such that the imaging element flexible cable, and the imaging element as mounted on the flexible cable, are disposed to the rear of the mount;
   a metal plate connected to the mount and disposed between the imaging element and the main circuit board, wherein:
      the main circuit board includes, on one portion of the main circuit board GND, a GND exposed part; and
      the imaging device further comprises a frame covering the imaging device and including a metallic component, and
      a GND connection part connecting the frame and the GND exposed part.

* * * * *

UNITED STATES PATENT AND TRADEMARK OFFICE
CERTIFICATE OF CORRECTION

PATENT NO. : 8,797,452 B2  
APPLICATION NO. : 13/392880  
DATED : August 5, 2014  
INVENTOR(S) : Tobinaga et al.

Page 1 of 1

It is certified that error appears in the above-identified patent and that said Letters Patent is hereby corrected as shown below:

On the Title Page, Item 30 should read

--(30) Foreign Application Priority Data--; and beneath said itemized heading, the following priority-application-identifying data should appear:

--Feb. 2, 2011 (JP) .............................. 2011-021123--.

Signed and Sealed this  
Second Day of December, 2014

Michelle K. Lee  
*Deputy Director of the United States Patent and Trademark Office*